(12) United States Patent
Kubota et al.

(10) Patent No.: US 12,306,514 B2
(45) Date of Patent: May 20, 2025

(54) ILLUMINATION SYSTEM AND PHOTOGRAPHY SYSTEM

(71) Applicant: SHARP KABUSHIKI KAISHA, Sakai (JP)

(72) Inventors: Hidemasa Kubota, Sakai (JP); Kinya Nobori, Sakai (JP); Hiroshi Kawamura, Sakai (JP); Chika Hirakawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 166 days.

(21) Appl. No.: 18/232,847

(22) Filed: Aug. 11, 2023

(65) Prior Publication Data
US 2024/0073505 A1  Feb. 29, 2024

(30) Foreign Application Priority Data
Aug. 25, 2022  (JP) .................. 2022-133705

(51) Int. Cl.
  *G03B 15/10* (2021.01)
  *H04N 23/56* (2023.01)

(52) U.S. Cl.
  CPC ............. *G03B 15/10* (2013.01); *H04N 23/56* (2023.01); *G03B 2215/0514* (2013.01)

(58) Field of Classification Search
  CPC ........ H04N 23/56; H04N 23/71; H04N 23/74; G03B 15/003; G03B 15/02; G03B 15/03; G03B 15/06; G03B 15/10; G03B 2215/0514
  See application file for complete search history.

(56) References Cited

U.S. PATENT DOCUMENTS

2024/0414427 A1*  12/2024  Sugano ................. H04N 5/222

FOREIGN PATENT DOCUMENTS

JP       2010-078854 A        4/2010
WO    WO-2015085895 A1 *   6/2015    ............. G03B 15/07

OTHER PUBLICATIONS

Machine Translation for WO 2015/085895 A1 published Jun. 18, 2015 (Year: 2015).*

* cited by examiner

*Primary Examiner* — Daniel M Pasiewicz
(74) *Attorney, Agent, or Firm* — ScienBiziP, P.C.

(57) ABSTRACT

An illumination system includes: an irradiation device that irradiates light to a subject located in front of a displayer that displays a background image; an information acquisition device that acquires subject information for identifying the subject; a storage that stores background image information on the background image displayed on the displayer; and a controller that controls irradiation by the irradiation device. The controller generates shape information of the subject on basis of a difference between the subject information acquired by the information acquisition device and the background image information stored in the storage, and sets an irradiation range where light is irradiated by the irradiation device on basis of the shape information.

10 Claims, 18 Drawing Sheets

ILLUMINATION SYSTEM AND PHOTOGRAPHY SYSTEM

CROSS-REFERENCE TO RELATED APPLICATION

The present application claims priority from Japanese Application JP2022-133705, the content of which is hereby incorporated by reference into this application.

BACKGROUND OF THE INVENTION

1. Field of the Invention

The present disclosure relates to an illumination system and a photography system.

2. Description of the Related Art

In a conventional technique, an irradiation device that irradiates an object to be irradiated (subject) has been proposed.

In the irradiation device disclosed in the conventional technique, a user operates a control stick to set an illumination light projection range (irradiation range) on a subject, and the irradiation device irradiates the set irradiation range. With this configuration, it is possible to irradiate the subject with the illumination light in the conventional technique.

SUMMARY OF THE INVENTION

However, in the conventional technique described above, the irradiation processing to irradiate a subject with light is complicated because the irradiation range must be set by the user.

It is an object of the present disclosure to propose an illumination system that can easily irradiate a subject with light.

An illumination system according to one aspect of the present disclosure includes an irradiation device that irradiates light to a subject located in front of a displayer that displays a background image, an information acquisition device that acquires subject information for identifying the subject, a storage that stores background image information on the background image displayed on the displayer, and a controller that controls irradiation by the irradiation device. The controller generates shape information of the subject on basis of a difference between the subject information acquired by the information acquisition device and the background image information stored in the storage, and sets an irradiation range where light is irradiated by the irradiation device on basis of the shape information.

A photography system according to one aspect of the present disclosure includes an irradiation device that irradiates light to a subject located in front of a displayer that displays a background image, an information acquisition device that acquires subject information for identifying the subject, a storage that stores background image information on the background image displayed on the displayer, and a controller that controls irradiation by the irradiation device. The photography system includes an illumination system in which the controller generates shape information of the subject on basis of a difference between the subject information acquired by the information acquisition device and the background image information stored in the storage, and sets an irradiation range where light is irradiated by the irradiation device on basis of the shape information, a display device that has the displayer, and a photography device that photographs the subject together with the background image displayed on the displayer.

According to one aspect of the present disclosure, the illumination system can easily and appropriately irradiate a subject.

DETAILED DESCRIPTION OF THE INVENTION

Figure 1:
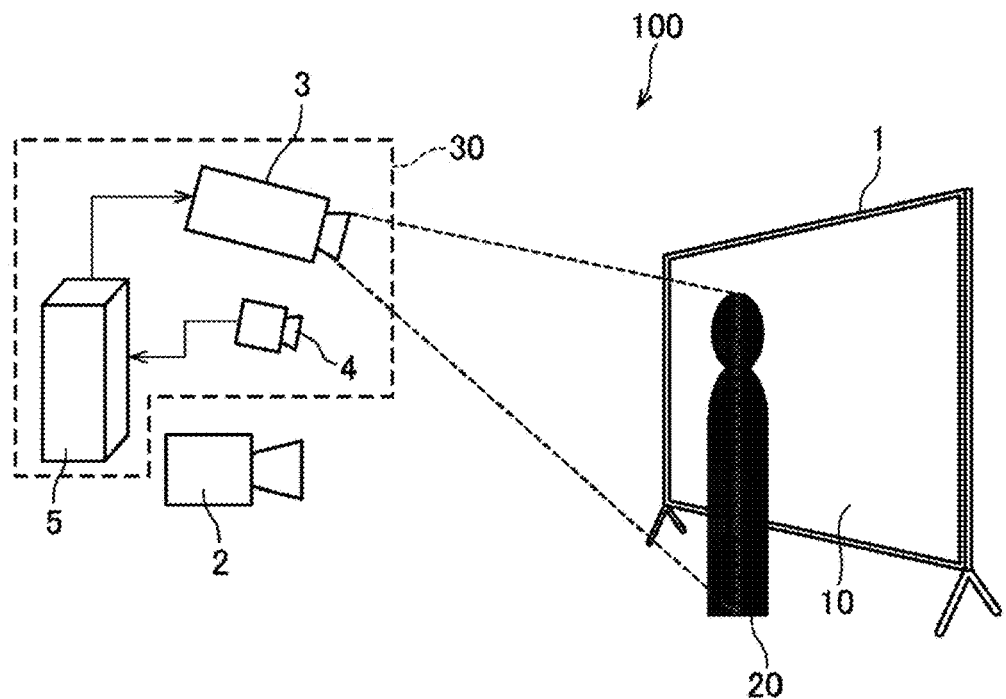
FIG. 1 is a diagram schematically illustrating a configuration of an important portion of a photography system according to a first embodiment of the present disclosure.

Hereinafter, an embodiment and modifications of the present disclosure will be described with reference to the accompanying drawings. Hereinafter, the same reference numerals are given to the same or equivalent components throughout all the drawings, and their duplicate descriptions are to be omitted. The embodiment and modifications described below are merely examples of the present disclosure, and the present disclosure is not limited to the embodiment and modifications. Other than the embodiment and the modifications, various changes may be made according to the design, etc., without departing from the technical concept of the present disclosure.

First Embodiment

Photography System

A photography system 100 according to a first embodiment of the present disclosure will be described with reference to FIG. 1. FIG. 1 is a diagram schematically illustrating a configuration of an important portion of the photography system 100 according to an embodiment of the present disclosure.

As illustrated in FIG. 1, the photography system 100 includes a display device 1, a photography device 2, and an illumination system 30.

The display device 1 is an output device that outputs information such as background images on the basis of externally input data, and the examples include liquid crystal displays, light emitting diode (LED) displays, organic light emitting diode (OLED) displays, and plasma displays. The display device 1 has a displayer 10 that displays information such as background images.

The photography device 2 photographs a subject 20 located in front of the displayer 10 along with a background image displayed on the displayer 10.

The illumination system 30 identifies the position and shape of the subject 20 and causes light to be irradiated on the subject 20. Details of the illumination system 30 will be described below.

The photography system 100 is a system that performs so-called virtual production in which the subject 20 is located in front of the displayer 10 and the subject 20 is photographed together with a background image displayed on the displayer 10. By changing the background image to be displayed on the displayer 10 in various ways, the subject 20 can be photographed with various images in the background. The side of the display device 1 on which the background image is displayed on the displayer 10 is defined as the front side, and the opposite side is defined as the rear side. Further, the right-left direction of the display device 1 is defined with reference to the display device 1 viewed from the front side toward the rear side.

Figure 2:
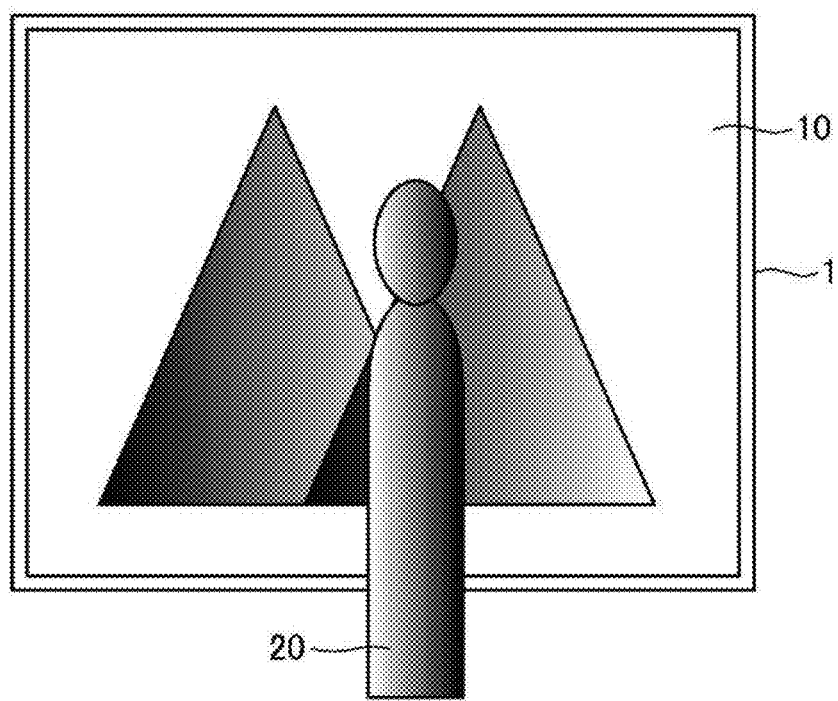
FIG. 2 is a diagram schematically illustrating an example of an image when the direction of the shading of a background image displayed on a displayer of a display device according to the first embodiment of the present disclosure does not match the direction of the shading of a subject.

When an image is produced by photographing the subject 20 together with a background image displayed on the displayer 10, if the direction of shading in the background image and the direction of shading in the subject 20 do not match, the image will look uncomfortable, for example, as illustrated in FIG. 2. FIG. 2 is a diagram schematically illustrating an example of an image when the direction of the shading of a background image displayed on a displayer 10 of the display device 1 according to the first embodiment of the present disclosure does not match the direction of the shading of the subject 20. In the image illustrated in FIG. 2, the background image is shaded in the lower left direction, whereas the subject 20 is shaded in the right direction. Such differences in the direction of the shading lead to a sense of discomfort with the images photographed by the photography device 2. Therefore, it is required to match the direction of shading in the background image and the subject 20.

Further, if light is irradiated toward the background image and the subject 20 to match the direction in which the shading is generated, the light may be reflected by the displayer 10 that is displaying the background image, or the shadow of the subject 20 may be reflected in the background image.

Therefore, the illumination system 30 according to the first embodiment of the present disclosure is configured to identify the position and shape of the subject 20 and to cause light to be irradiated to only the subject 20 in such a manner that the subject is shaded in the same direction as the background image.

Illumination System

The illumination system 30 according to the first embodiment of the present disclosure will be described. As illustrated in FIG. 1, the illumination system 30 includes an irradiation device 3, an information acquisition device 4, and a setting processing device 5.

The irradiation device 3 is a device that irradiates the subject 20 with light, and has functions of controlling the orientation from the light source and adjusting the light color. The irradiation device 3 can be exemplified as a projector or a laser irradiation device. In a case where the irradiation device 3 is a projector, the irradiation device 3 can irradiate only the set irradiation range by making the range set as the irradiation range white and the other range black.

The information acquisition device 4 is a device for acquiring subject information 71, and when the subject information 71 is acquired, the information acquisition device 4 transmits same to the setting processing device 5.

The subject information 71 is information used to identify the location of the subject 20, and is information that makes the subject 20 distinguishable from the background image displayed on the displayer 10. If the subject 20 and the background image (displayer 10) are distinguished on the basis of the difference in distance from the information acquisition device 4, the subject information 71 includes at least information on a distance to the subject 20. In a case where the subject information 71 includes information on the distance to the subject 20, the information acquisition device 4 can be implemented by a distance measurement sensor (distance measurement device).

The distance measurement sensors emit signals such as ultrasonic, infrared, or laser light, receive the signals reflected back by an object to be measured, and measure the distance to the object on the basis of the received results. For example, LiDAR (light detection and ranging) can be given as an example.

Figure 3:
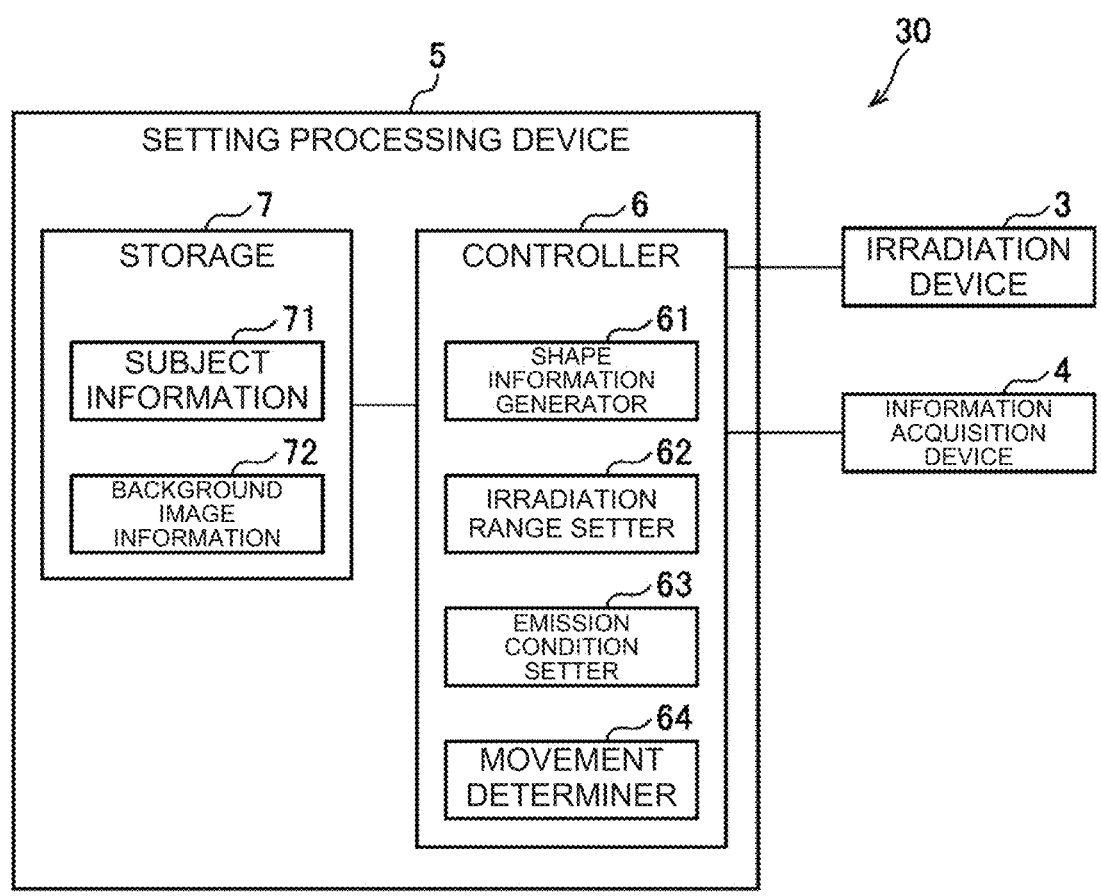
FIG. 3 is a block diagram illustrating an example of a configuration of an important portion of an illumination system according to the first embodiment of the present disclosure.

The setting processing device 5 sets various conditions for light emission by the irradiation device 3. Specifically, the setting processing device 5 sets the irradiation range where light is irradiated by the irradiation device 3. Further, the setting processing device 5 sets the emission conditions, such as the intensity and direction of the light emitted toward the irradiation range. As illustrated in FIG. 3, the setting processing device 5 includes a controller 6 and a storage 7. FIG. 3 is a block diagram illustrating an example of a configuration of an important portion of the illumination system 30 according to the first embodiment of the present disclosure.

The storage 7 is a readable/writable storage medium, and can be implemented by, for example, a hard disk or a semiconductor memory such as a flash memory. The storage 7 stores the subject information 71 acquired by the information acquisition device 4 and background image information 72 on the background image to be displayed on the display device 1. The background image information 72 includes, for example, image data of a background image to be displayed on the displayer 10 or information of a distance to the displayer 10 where the background image is displayed. Further, the information of the distance to the displayer 10 may be the actual distance to the displayer 10, or may be a threshold value that makes it possible to discriminate from the measured distance, whether the measurement target is the displayer 10.

The background image information 72 may be stored in the storage 7 in advance. Further, in a case where the background image information 72 is image data of a background image, for example, the background image information 72 may be acquired from the display device 1 via a communicator (not illustrated). Furthermore, in a case where the background image information 72 is information of a distance to the displayer displaying the background image, the background image information 72 may be obtained by the information acquisition device 4.

The controller 6 is an arithmetic processing unit that executes various controls of the various parts included in the setting processing device 5, and can be implemented, for example, by a central processing unit (CPU). The controller 6 includes a shape information generator 61, an irradiation range setter 62, and an emission condition setter 63 as functional blocks for executing the irradiation range setting processing described below. In a case where the controller 6 is a CPU, each of these functional blocks may be implemented by the CPU reading and executing a program (not illustrated) stored in the storage 7.

The shape information generator 61 generates shape information of the subject 20 on the basis of the subject information 71 acquired by the information acquisition device 4.

The irradiation range setter 62 sets the irradiation range where light is irradiated by the irradiation device 3 on the basis of a difference between the shape information generated by the shape information generator 61 and the background image information 72.

On the basis of the image data included in the background image information 72 stored in the storage 7, the emission condition setter 63 sets emission conditions such as the intensity and emission direction of the light emitted from the irradiation device 3 toward the set irradiation range in such a manner that the shading direction of the background image and the shading direction of the subject 20 match, on the basis of the image data included in the background image information 72 stored in the storage 7.

The irradiation device 3 emits light to the irradiation range set by the irradiation range setter 62 on the basis of the emission conditions set by the emission condition setter 63.

Photographic Illumination Processing

Figure 4:
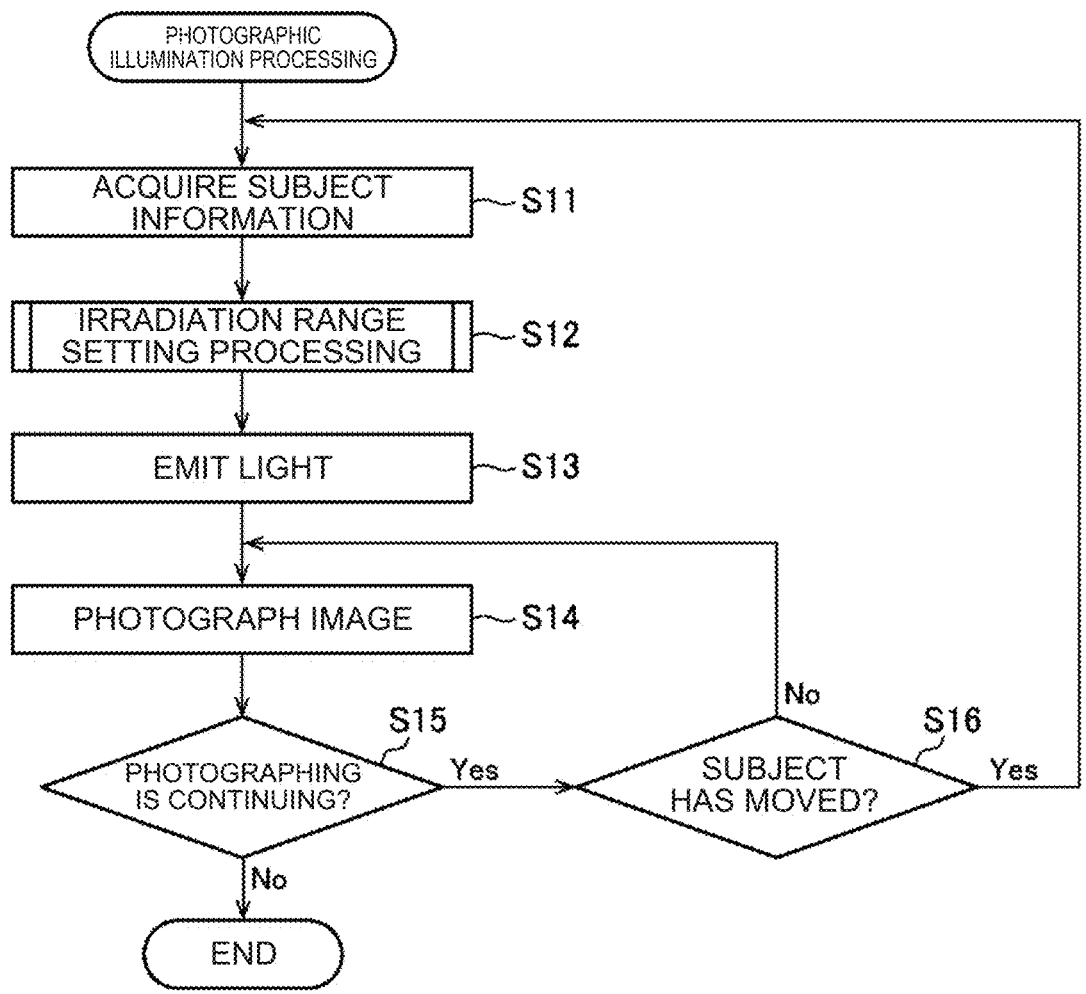
FIG. 4 is a flowchart illustrating an example of photographic illumination processing in the illumination system according to the first embodiment of the present disclosure.

The photographic illumination processing in the illumination system 30 according to the first embodiment of the present disclosure will be described with reference to FIG. 4. FIG. 4 is a flowchart illustrating an example of photographic illumination processing in the illumination system 30 according to the first embodiment of the present disclosure. As a premise, it is assumed that the subject 20 exists in front of the displayer 10 on which the background image is displayed.

First, in the illumination system 30, the information acquisition device 4 acquires subject information 71 (step S11) and transmits same to the setting processing device 5. The setting processing device 5 performs the irradiation range setting processing on the basis of the subject information 71 (step S12).

On the basis of the irradiation range and emission conditions set by the irradiation range setting processing in step S12, the irradiation device 3 emits light toward the set irradiation range (step S13).

In this manner, after the irradiation device 3 emits light toward the subject 20, the photography device 2 photographs an image including the subject 20 (step S14). Then, the setting processing device 5 next determines whether the photography device 2 is continuing to photograph (step S15). Here, while the photography device 2 continues to photograph, that is, while the setting processing device 5 determines "Yes" in step S15, the movement determiner 64 determines whether the subject 20 has moved (step S16). The determination of whether the subject 20 has moved can be performed, for example, as follows. In other words, the information acquisition device 4 sequentially acquires subject information 71 at predetermined intervals. The movement determiner 64 examines the time-series changes in the subject information 71 acquired by the information acquisition device 4. The movement determiner 64 then determines that the subject 20 has moved if the subject information 71 acquired by the information acquisition device 4 has changed. On the other hand, if there is no change in the subject information 71, the movement determiner 64 determines that the subject 20 has not moved.

If the movement determiner 64 determines that the subject 20 has moved ("Yes" in step S16), the processing returns to step S11 to repeat the processing and update the irradiation range information. In this way, when the movement determiner 64 determines that the subject 20 has moved, the irradiation range information can be updated, allowing the irradiation range to be set in accordance with the movement of the subject 20.

On the other hand, if the movement determiner 64 determines that the subject 20 has not moved ("No" in step S16), the processing proceeds to step S14, and the photography device 2 executes photographing. Then, when the setting processing device 5 determines that photography has been completed ("No" in step S15), the photographic illumination processing ends. The setting processing device 5 is equipped with an operation indicator such as an operation button (not illustrated), and the end of photography can be determined by accepting a signal indicating the end of the photographic illumination processing via the operation indicator.

Figure 5:
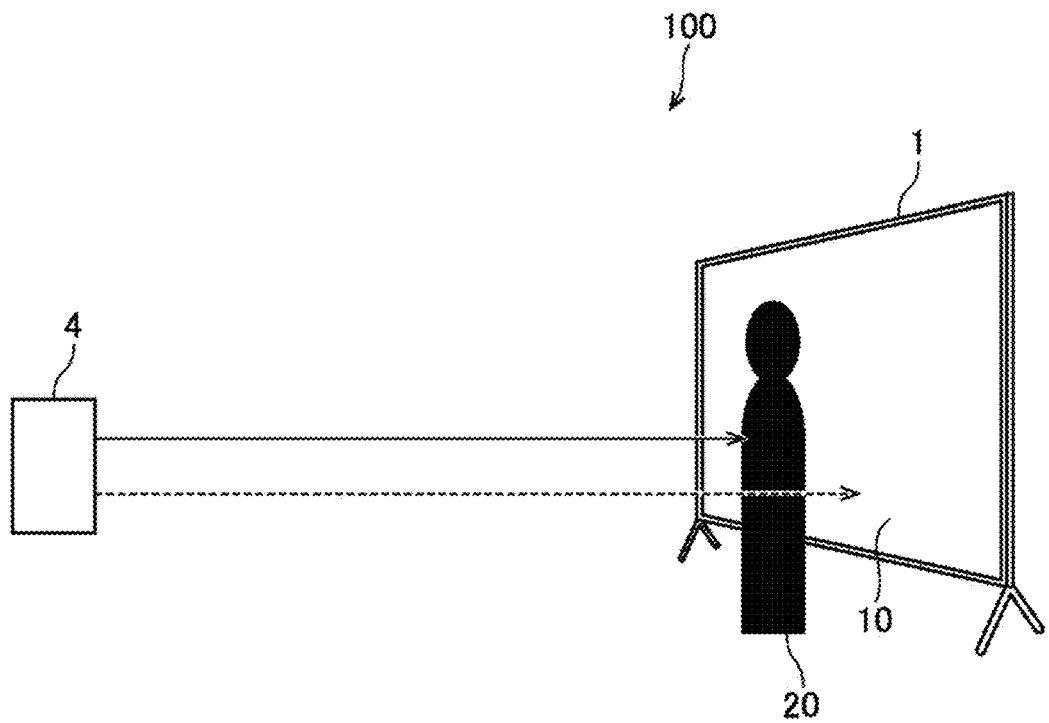
FIG. 5 is a diagram schematically illustrating a difference between the distance to the subject and the distance to the displayer measured by an information acquisition device included in the illumination system according to the first embodiment of the present disclosure.
Figure 6:
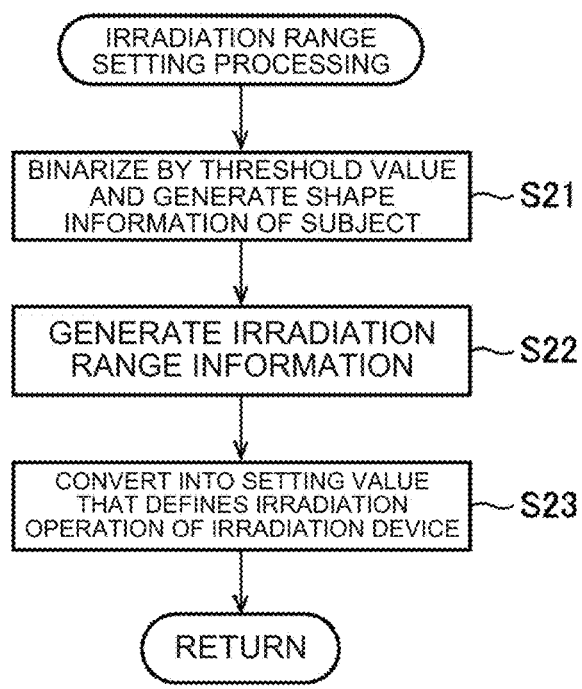
FIG. 6 is a flowchart illustrating an example of irradiation range setting processing in the photographic illumination processing illustrated in FIG. 4.

Here, the irradiation range setting processing in step S12 is specifically described with reference to FIGS. 5 and 6. FIG. 5 is a diagram schematically illustrating a difference between the distance to the subject 20 and the distance to the displayer 10 measured by an information acquisition device 4 included in the illumination system 30 according to the first embodiment of the present disclosure. Further, FIG. 6 is a flowchart illustrating an example of the irradiation range setting processing in the photographic illumination processing illustrated in FIG. 4.

First, the illumination system 30 is equipped with a distance measurement sensor as the information acquisition device 4, and the subject information 71 acquired by the information acquisition device 4 shall include at least information on the distance to the subject 20. Further, the storage 7 includes, as the background image information 72, threshold value information that can discriminate whether the measurement target is the displayer 10 on which the background image is displayed, on the basis of the information of the distance measured by the information acquisition device 4.

As illustrated in FIG. 5, the distance from the information acquisition device 4 to the subject 20 is different from the distance from the information acquisition device 4 to the displayer 10 of the display device 1, the former being shorter than the latter. Here, when the distance from the information acquisition device 4 to the displayer 10 is, for example, 10 m, 9 m is set as the threshold value in consideration of the measurement error or the like by the information acquisition device 4, and this threshold value is stored by the setting processing device 5 in the storage 7 as the background image information 72. In doing so, depending on whether the distance measured by the information acquisition device 4 is above or below this threshold value, it is possible to distinguish whether the point to be measured by the information acquisition device 4 is within the range of the subject 20 or the range of the displayer 10 where the background image is displayed.

In the case of a configuration that uses a threshold value to distinguish whether the point to be measured is within the range of the subject 20 or the range of the displayer 10 on the basis of the distance measurement results, it is preferable for the information acquisition device 4 to be provided at a position directly facing the displayer 10. Further, the irradiation device 3 and the information acquisition device 4 are provided close together in such a manner that the distance from the irradiation device 3 to the subject 20 can be regarded as the distance from the information acquisition device 4 to the subject 20.

Specifically, in the irradiation range setting processing, the information acquisition device 4 emits a signal toward the display device 1 and the subject 20. The information acquisition device 4 emits a signal multiple times by changing the emission direction so as to cover the entire displayer 10 in the vertical and horizontal directions, respectively, to measure the distance. The information acquisition device 4 then transmits the distance information obtained from the measurement to the setting processing device 5. A virtual coordinate plane is set up to enable the identification of a given position when the subject 20 and displayer 10 are viewed from the information acquisition device 4, and the distance information transmitted to the setting processing device 5 is associated with information indicating coordinates on the coordinate plane. The distance information obtained by the information acquisition device 4 thus includes the emission direction in which the information acquisition device 4 emits signals and the measurement results of distances measured by this signal emission. This virtual coordinate plane can then be obtained by arranging the distance measurement results obtained for each emission direction in two dimensions.

If there is no subject 20 in front of the displayer 10, the distance information obtained by the information acquisition device 4 is approximately the same distance at any coordinate position. However, if the subject 20 is present, the distance becomes shorter because the emitted signal is reflected by the subject 20 at the coordinate position where the subject 20 is present and returns to the information acquisition device 4.

In the setting processing device 5, the shape information generator 61 in the controller 6 binarizes this measurement result on the basis of the measurement result obtained by the information acquisition device 4 as being above or below a threshold value. Then, information indicating the range (coordinate position) of the set of measurement results belonging to less than the threshold value is generated as the shape information of the subject 20 (step S21).

Next, the irradiation range setter 62 generates irradiation range information indicating the range where light is irradiated by the irradiation device 3, on the basis of the shape information of the subject 20 (step S22). Then, the emission condition setter 63 converts this irradiation range information into a setting value that defines the irradiation operation of the irradiation device 3 (step S23) and outputs same to the irradiation device 3.

First Modification of First Embodiment

Figure 7:
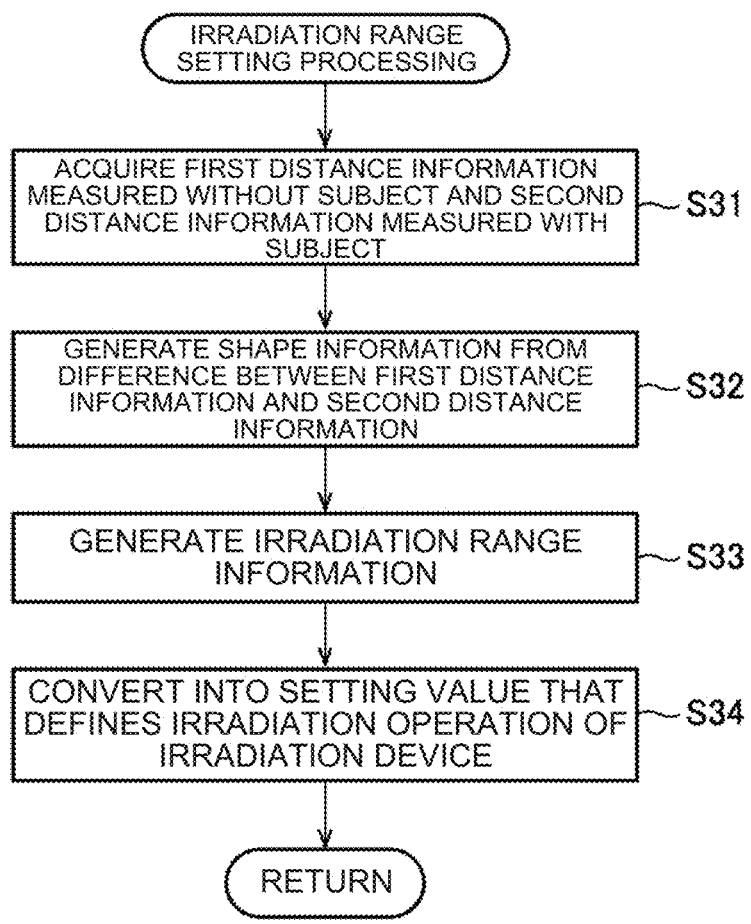
FIG. 7 is a flowchart illustrating an example of the irradiation range setting processing performed by an illumination system according to a first modification of the first embodiment of the present disclosure.

As described above, the illumination system 30 according to the first embodiment has a configuration in which, in the irradiation range setting processing, the setting processing device 5 uses a threshold value to distinguish whether the point where the distance is measured is within the range of the subject 20 or within the range of the displayer 10, and generates shape information of the subject 20. In contrast, in the illumination system 30 according to the first modification of the first embodiment, as illustrated in FIG. 7, the setting processing device 5 generates the shape information of the subject 20 as follows, without setting the threshold value in advance. FIG. 7 is a flowchart illustrating an example of the irradiation range setting processing performed by the illumination system 30 according to the first modification of the first embodiment of the present disclosure. Each processing of the illumination system 30 according to the first modification of the first embodiment is the same as that of the illumination system 30 according to the first embodiment, except only for the irradiation range setting processing in step S12, which is included in the photographic illumination processing. For this reason, any processing similar to that of the first embodiment is not described below.

First, in the illumination system 30 according to the first modification of the first embodiment, the setting processing device 5 acquires the first distance information by measuring the distance to the displayer 10 with no subject 20, as the background image information 72 in advance, and stores same in the storage 7. The information acquisition device 4 measures the distance to the displayer 10 when the subject 20 is located in front of the displayer 10 as the subject information 71, and acquires second distance information.

Then, the irradiation range setting processing illustrated FIG. 7 is executed. In the irradiation range setting processing, the setting processing device 5 first acquires the first distance information measured without the subject 20 from the storage 7. Furthermore, the setting processing device 5 acquires the second distance information measured with the subject 20 present from the information acquisition device 4 (step S31).

In the setting processing device 5, the shape information generator 61 takes the difference between the first distance information and second distance information and generates shape information from this difference (step S32). In other words, the shape information generator 61 generates, as the shape information of the subject 20, information indicating the range (coordinate positions) of the set of coordinate positions that are different distances by comparing the first distance information and the second distance information.

Next, the irradiation range setter 62 generates irradiation range information indicating the range where light is irradiated by the irradiation device 3, on the basis of the shape information of the subject 20 (step S33). Then, the emission condition setter 63 converts this irradiation range information into a setting value that defines the irradiation operation of the irradiation device 3 (step S34) and outputs same to the irradiation device 3.

Second Modification of First Embodiment

In the illumination system 30 according to the first embodiment of the present disclosure and the illumination system 30 according to the first modification of the first embodiment described above, the information acquisition device 4 and the irradiation device 3 are provided at positions close to each other.

However, it is not always possible to install the illumination system 30 in such a manner that the information acquisition device 4 and the irradiation device 3 are provided at positions close to each other. Therefore, in the illumination system 30 according to the second modification of the first embodiment of the present disclosure, the information acquisition device 4 and the irradiation device 3 are not disposed in close proximity to each other.

Figure 8:
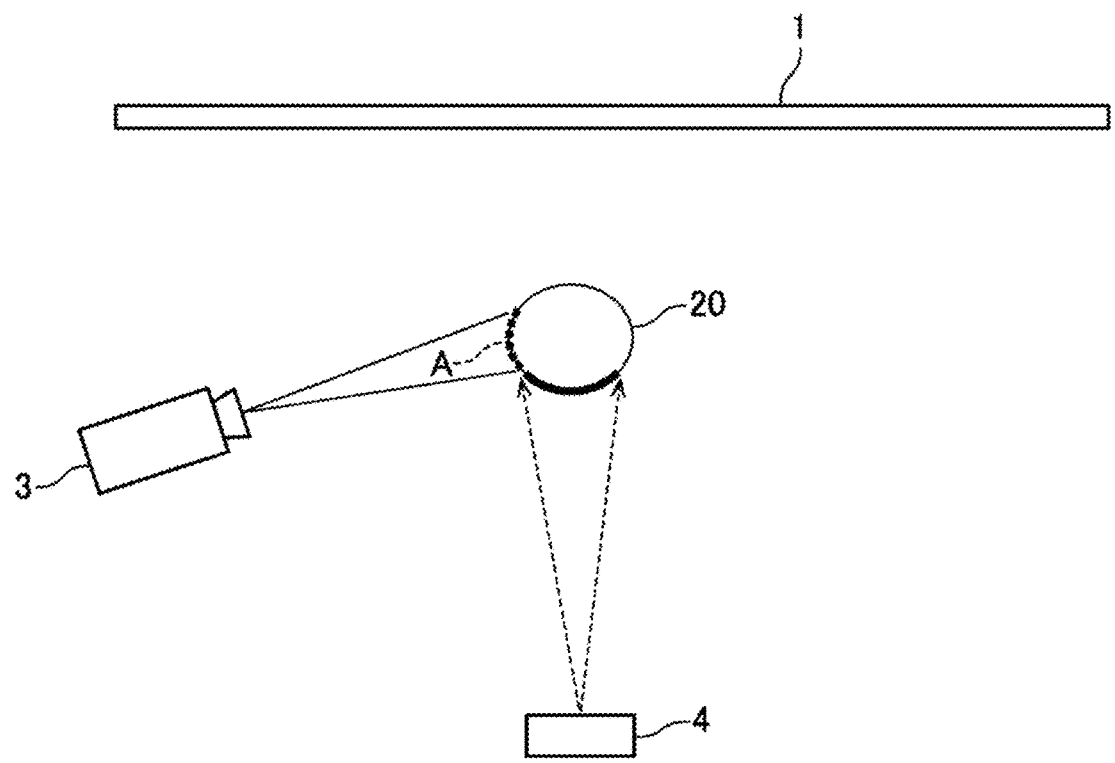
FIG. 8 is a diagram schematically illustrating an example of a case where the range that can be defined by the irradiation range information generated by the subject information acquired by the information acquisition device according to the first embodiment of the present disclosure is different from the range irradiated by the irradiation device.

As described above, in a case where the information acquisition device 4 and the irradiation device 3 are not disposed in close proximity to each other, as illustrated in FIG. 8, for example, the irradiation device 3 may irradiate a range other than that defined by the irradiation range information generated on the basis of the subject information 71 acquired by the information acquisition device 4. FIG. 8 is a diagram schematically illustrating an example of a case where the range that can be defined by the irradiation range information generated by the subject information 71 acquired by the information acquisition device 4 according to the first embodiment of the present disclosure is different from the range irradiated by the irradiation device 3.

If the irradiation device 3 irradiates ranges other than those that can be defined by the irradiation range information, the irradiation device 3 cannot irradiate the appropriate range. Therefore, in the illumination system 30 according to the second modification of the first embodiment, the setting processing device 5 is configured to obtain the three-dimensional shape of the subject 20 and generate irradiation range information on the basis of this three-dimensional shape. Further, in the illumination system 30 according to the second modification of the first embodiment, the illumination system 30 is configured in such a manner that the irradiation device 3 can properly irradiate light even to a surface of the subject 20 (e.g., a side surface A of the subject 20) for which the distance cannot be directly measured by the information acquisition device 4.

In the illumination system 30 according to the second modification of the first embodiment, information identifying the light source position is stored in advance in the storage 7 to define the irradiation range when viewed from the light source of the irradiation device 3 toward the subject 20. The information identifying the light source position can be, for example, information indicating the relative positional relation between the light source and the information acquisition device 4. This information identifying the light source position can be obtained by manually measuring the positional relation between the light source of the irradiation device 3 and the information acquisition device 4 in advance. Alternatively, the information can be obtained, for example, by installing a distance measurement sensor on the ceiling and measuring the positional relation between the light source of the irradiation device 3 and the information acquisition device 4 by this distance measurement sensor. When measuring the positional relation between the light source of the irradiation device 3 and the information acquisition device 4, a marker may be attached to each of the light source of the irradiation device 3 and the information acquisition device 4, and information identifying the light source position may be obtained by measuring the distance between the assigned markers.

Figure 9:
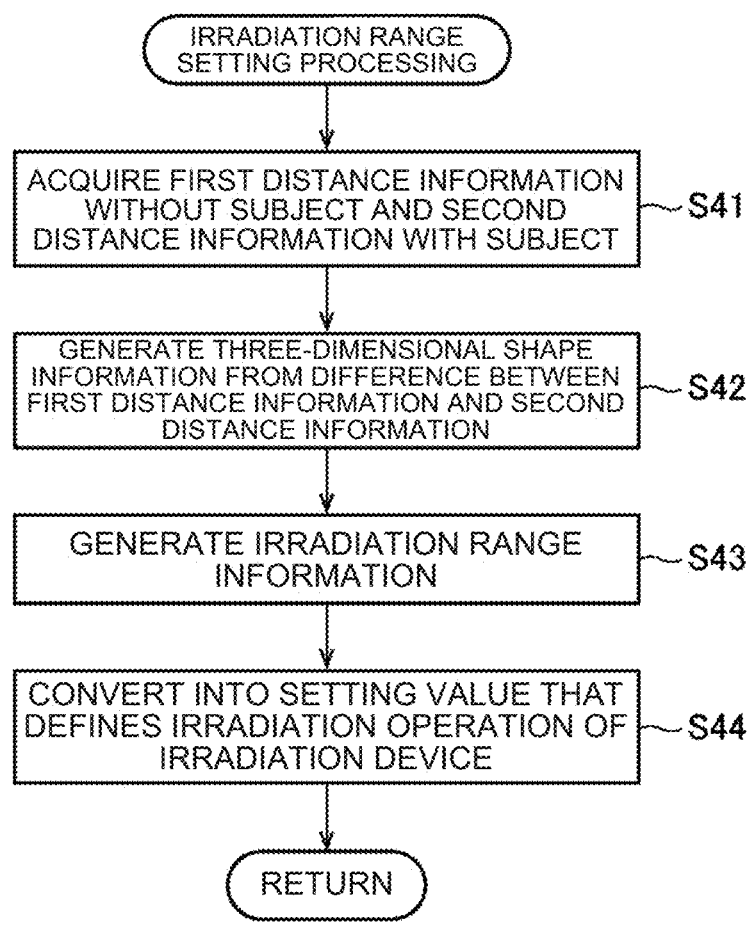
FIG. 9 is a flowchart illustrating an example of the irradiation range setting processing performed by an illumination system according to a second modification of the first embodiment of the present disclosure.

Specifically, the setting processing device 5 performs the irradiation range setting processing in the manner as illustrated in FIG. 9. FIG. 9 is a flowchart illustrating an example of the irradiation range setting processing performed by the illumination system 30 according to the second modification of the first embodiment of the present disclosure. The illumination system 30 according to the second modification of the first embodiment differs from the illumination system 30 according the first modification of the first embodiment in the irradiation range setting processing included in the photographic illumination processing. Since other processing is the same, the description of the similar processing is omitted. In other words, in the illumination system 30 according to the second modification of the first embodiment, the first distance information and second distance information is obtained in the same manner as in step S31 illustrated in FIG. 7 (step S41). Next, in the illumination system 30, the shape information generator 61 takes the difference between the first distance information and second distance information and generates shape information from this difference. In other words, the shape information generator 61 generates, as the shape information of the subject 20, information indicating the range (coordinate positions) of the set of coordinate positions that are different distances by comparing the first distance information and the second distance information. Furthermore, on the basis of this generated shape information, the shape information generator 61 generates three-dimensional shape information indicating the subject 20 (step S42).

The three-dimensional shape information, for example, if the subject 20 is known in advance to be a person, information indicating a typical three-dimensional shape of a person is stored in the storage 7 in advance. The shape information generator 61 generates three-dimensional shape information indicating the subject 20 on the basis of the generated shape information and the information indicating the three-dimensional shape stored in the storage 7.

Alternatively, three distance measurement sensors may be provided as the information acquisition device 4 at a position directly facing the displayer 10 and at positions on the right and left sides of the displayer 10, and the three-dimensional shape information of the subject 20 may be generated on the basis of the measurement results of the three distance measurement sensors.

Next, the irradiation range setter 62 generates irradiation range information indicating the range where light is irradiated by the irradiation device 3, on the basis of the three-dimensional shape information of the subject 20 (step S43). The irradiation range information is information that indicates the range of the subject 20 as viewed from the light source of the irradiation device 3. The irradiation range setter 62 generates irradiation range information on the basis of the three-dimensional shape information of the subject 20 and the information identifying the position of the light source of the irradiation device 3 that is stored in advance in the storage 7.

For example, the positional relation between the irradiation device 3 and the information acquisition device 4 is obtained from the information identifying the light source position stored in advance in the storage 7. Then, a first distance map viewed from the light source of the irradiation device 3 is generated in advance with the use of the positional relation between the irradiation device 3 and the information acquisition device 4 and the first distance information when there is no subject. Further, a second distance map viewed from the light source of the irradiation device 3 is generated with the use of the positional relation between the irradiation device 3 and the information acquisition device 4 and the second distance information when there is a subject. The irradiation range information is then generated from the difference between the first distance map and the second distance map.

Then, the emission condition setter 63 converts this irradiation range information into a setting value that defines the irradiation operation of the irradiation device 3 (step S44) and outputs same to the irradiation device 3.

As described above, the illumination system 30 according to the first embodiment as well as the first and second modifications of the first embodiment, can easily irradiate the subject 20 with light because the setting processing device 5 can identify the range of the subject 20 and set the irradiation range. Further, when photographing a subject together with a background image displayed on the displayer 10, the illumination system 30 can irradiate light to only the range where the subject 20 is present, and therefore the shading of the subject 20 can be adjusted to match the shading in the background image. It is also possible to prevent light irradiated toward the subject 20 from being reflected by the displayer 10 and the shadow of the subject 20 from being reflected in the background image.

In the illumination system 30 according to the first embodiment as well as the first and second modifications of the first embodiment, the irradiation device 3 is configured to irradiate light only to the range where the subject 20 is present (the range based on the irradiation range information). However, the embodiment is not limited to this configuration. For example, the irradiation device 3 may be configured to irradiate light to the range where the subject 20 is present (the range based on the irradiation range information) in such a manner that the irradiated range is brighter than the range where other background images are displayed.

Second Embodiment

Figure 10:
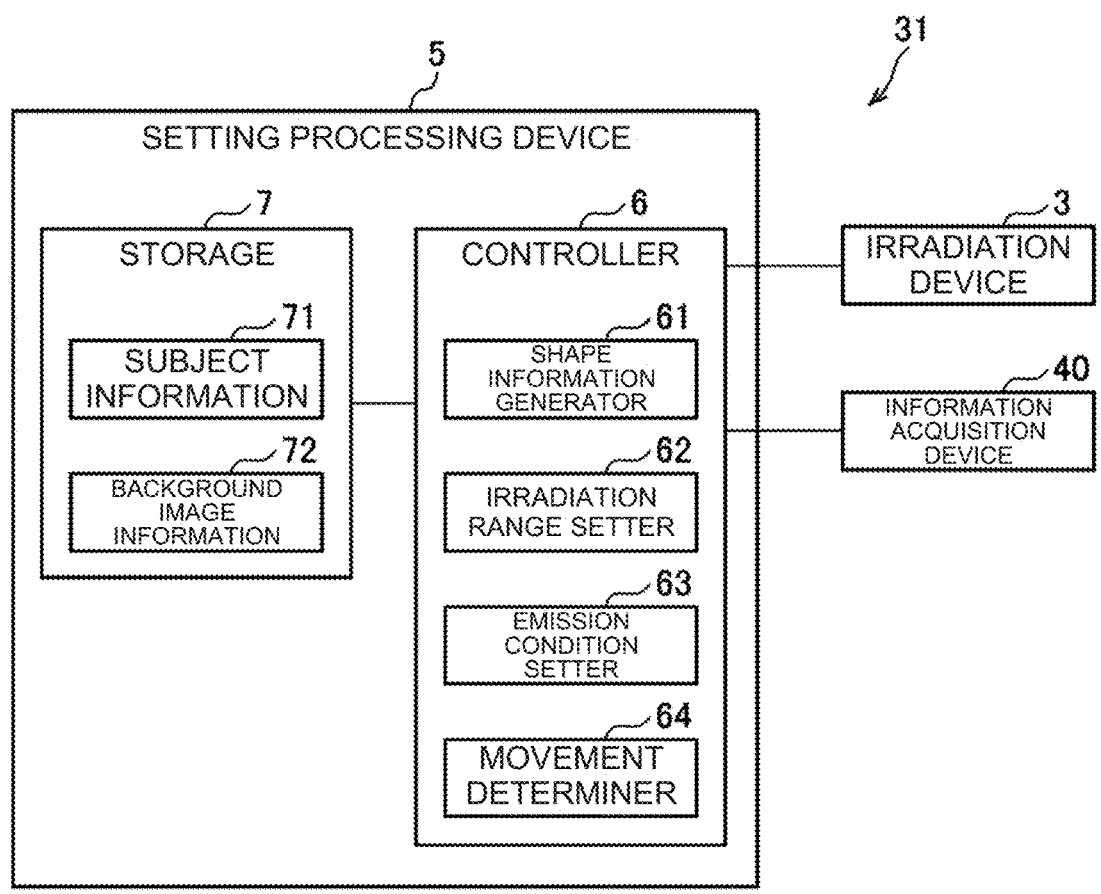
FIG. 10 is a block diagram illustrating a configuration of an important portion of an illumination system according to a second embodiment of the present disclosure.

An illumination system 31 according to a second embodiment will be described with reference to FIG. 10. FIG. 10 is a block diagram illustrating a configuration of an important portion of the illumination system 31 according to the second embodiment of the present disclosure.

In the illumination system 30 according to the first embodiment, the information acquisition device 4 is a distance measurement sensor. In contrast, the illumination system 31 according to the second embodiment differs in that the information acquisition device 40 is an imaging device that captures images of the subject 20. The imaging device can be, for example, a video camera or digital camera with a solid-state imaging element. Further, the subject information 71 acquired by the information acquisition device 40 differs in including at least the image data containing the image of the subject 20 (image data of the second image to be described below).

In the illumination system 31 according to the second embodiment, the information acquisition device 40, which is an imaging device, is provided separately from the photography device 2. However, the photography device 2 may also serve as the information acquisition device 40.

Further, in the illumination system 30 according to the first embodiment, the setting processing device 5 distinguishes between the background image and the subject 20 on the basis of the difference between the distance to the subject 20 and the distance to the displayer 10, and sets the irradiation range. In contrast, the illumination system 31 according to the second embodiment differs in that the illumination system 31 is configured to distinguish the subject 20 on the basis of the difference between the background image and the image of subject 20 photographed together with the background image, and to set the irradiation range.

The illumination system 31 according to the second embodiment is the same as the illumination system 30 according to the first embodiment except for the differences described above, and therefore the same reference numerals are given to the same members, and the description thereof is omitted.

Figure 11:
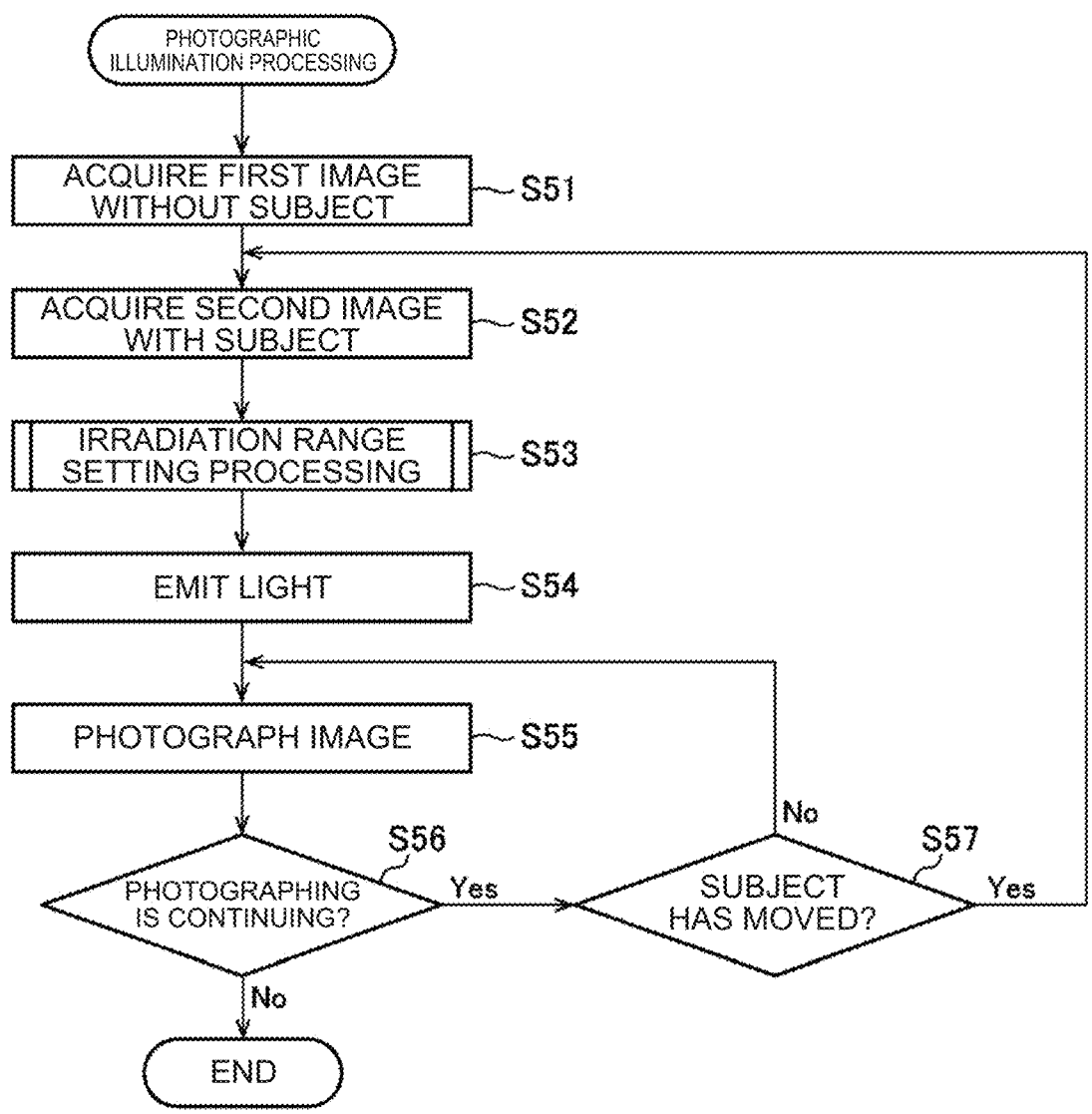
FIG. 11 is a flowchart illustrating an example of photographic illumination processing in the illumination system according to the second embodiment of the present disclosure.

The photographic illumination processing by the illumination system 31 according to the second embodiment will be described with reference to FIG. 11. FIG. 11 is a flowchart illustrating an example of the photographic illumination processing in the illumination system 31 according to the second embodiment of the present disclosure.

As illustrated in FIG. 11, in the illumination system 31 according to the second embodiment, the information acquisition device 40 acquires a first image by capturing the image of the displayer 10 with the subject 20 not present (step S51). The image data of the first image acquired by the information acquisition device 4 is then transmitted to the setting processing device 5. The setting processing device 5 then stores the image data of the first image transmitted from the information acquisition device 4 as the background image information 72 in the storage 7. In a case where the setting processing device 5 holds the image data of the first image as the background image information 72 in advance, step S51 can be omitted.

Next, the information acquisition device 40 acquires a second image by capturing the image of the displayer 10 with the subject 20 present as the subject information 71 (step S52). The image data of the acquired second image is then transmitted to the setting processing device 5.

A virtual coordinate plane is set in such a manner that a given position can be identified in the image acquired by the information acquisition device 40, and each pixel constituting the image data of each of the first and second images transmitted to the setting processing device 5 is associated with information indicating each coordinate position on the coordinate plane.

The setting processing device 5 performs the irradiation range setting processing on the basis of the image data of the first image and the image data of the second image acquired by the information acquisition device 40 as the subject information 71 (step S53). From this point on, step S54 to step S57 is the same as each processing from step S13 to step S16 illustrated in FIG. 4, and therefore, the description thereof is omitted.

Figure 12:
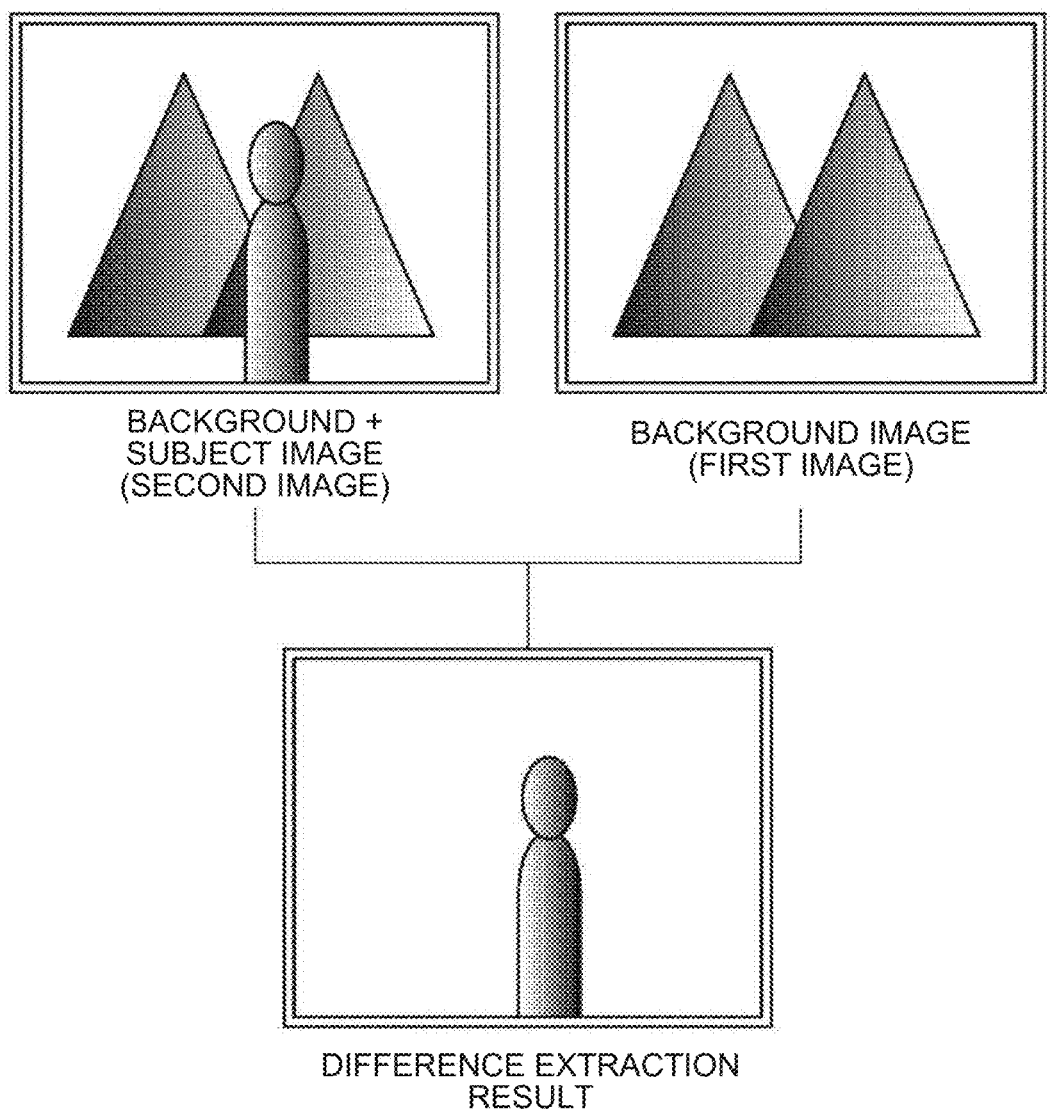
FIG. 12 is a diagram schematically illustrating the first and second images acquired in the illumination system according to the second embodiment of the present disclosure and the image obtained by the difference of the first and second images.
Figure 13:
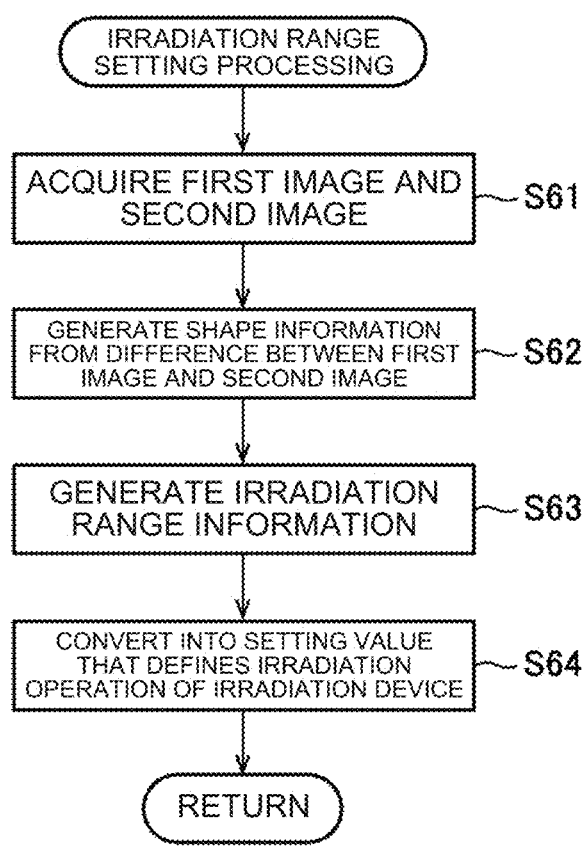
FIG. 13 is a flowchart illustrating an example of the irradiation range setting processing in the photographic illumination processing illustrated in FIG. 11.

Here, the irradiation range setting processing in step S53 is specifically described with reference to FIGS. 12 and 13. FIG. 12 is a diagram schematically illustrating the first and second images acquired in the illumination system 30 according to the second embodiment of the present disclosure and the image obtained by the difference of the first and second images. FIG. 13 is a flowchart illustrating an example of the irradiation range setting processing in the photographic illumination processing illustrated in FIG. 11.

As illustrated in FIG. 13, in the setting processing device 5, the shape information generator 61 in the controller 6 acquires image data of each of the first and second images acquired by the information acquisition device 40 (step S61).

Then, the shape information generator 61 compares the image data of the first image and the image data of the second image, takes the difference between them, and generates shape information (step S62). In other words, as illustrated in FIG. 12, the shape information generator 61 acquires the image data of the first image and the image data of the second image, removes the first image from the second image, and extracts the difference. The first image here is the background image, but may be an image displayed in a predetermined color. If the first image is an image displayed in a predetermined color, the difference can be easily extracted by removing the predetermined color portion from the second image. In this manner, the shape information generator 61 extracts the shape of the subject 20 from the difference between the first image and the second image, and generates the shape information of the subject 20.

Next, the irradiation range setter 62 generates irradiation range information indicating the range where light is irradiated by the irradiation device 3, on the basis of the shape information of the subject 20 (step S63). Then, the emission condition setter 63 converts this irradiation range information into a setting value that defines the irradiation operation of the irradiation device 3 (step S64) and outputs same to the irradiation device 3.

First Modification of Second Embodiment

When the information acquisition device 40 is not disposed at a position directly facing the displayer 10, the image acquired by the information acquisition device 40 has a deformed shape compared to the image acquired at a position directly facing.

Therefore, in a configuration where the information acquisition device 40 is not disposed at a position directly facing the displayer 10, if the background image information 72 (image data of the first image) held by the illumination system 31 is the image data of the image as viewed from a position directly facing the displayer 10, the difference between the first image and the second image cannot be taken as is.

Figure 14:
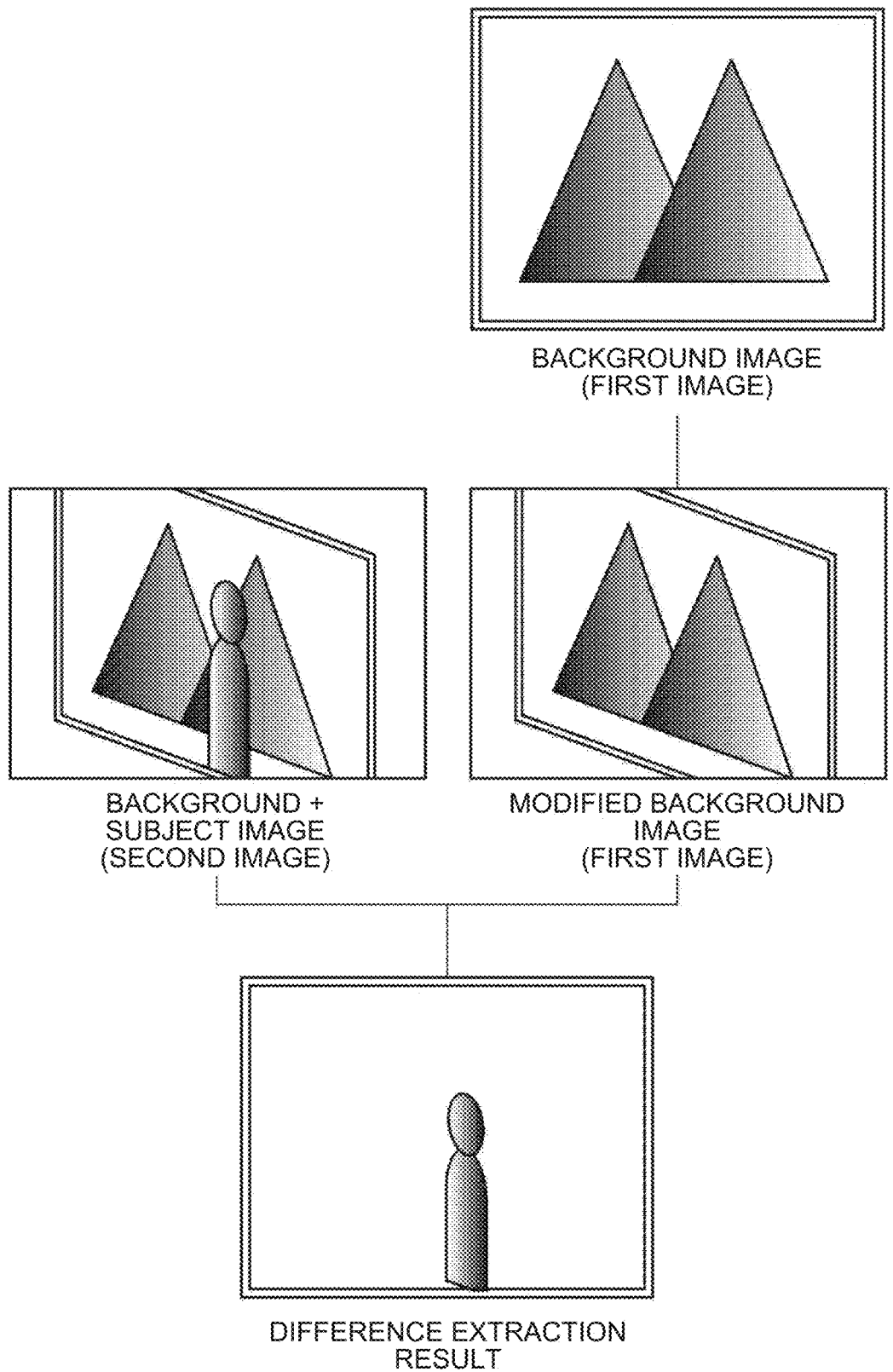
FIG. 14 is a diagram schematically illustrating the first and second images acquired in the illumination system according to a first modification of the second embodiment of the present disclosure and the image obtained by the difference of the first and second images.
Figure 15:
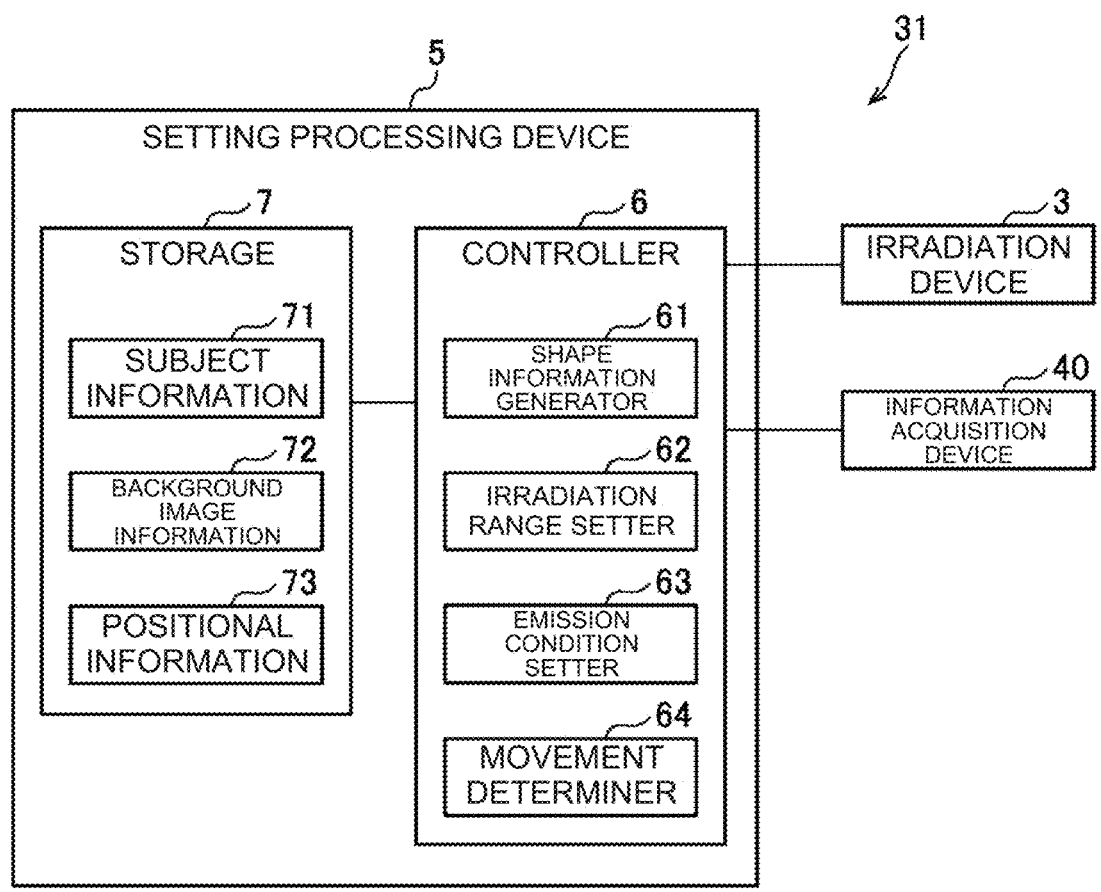
FIG. 15 is a block diagram illustrating a configuration of an important portion of an illumination system according to the first modification of the second embodiment of the present disclosure.
Figure 16:
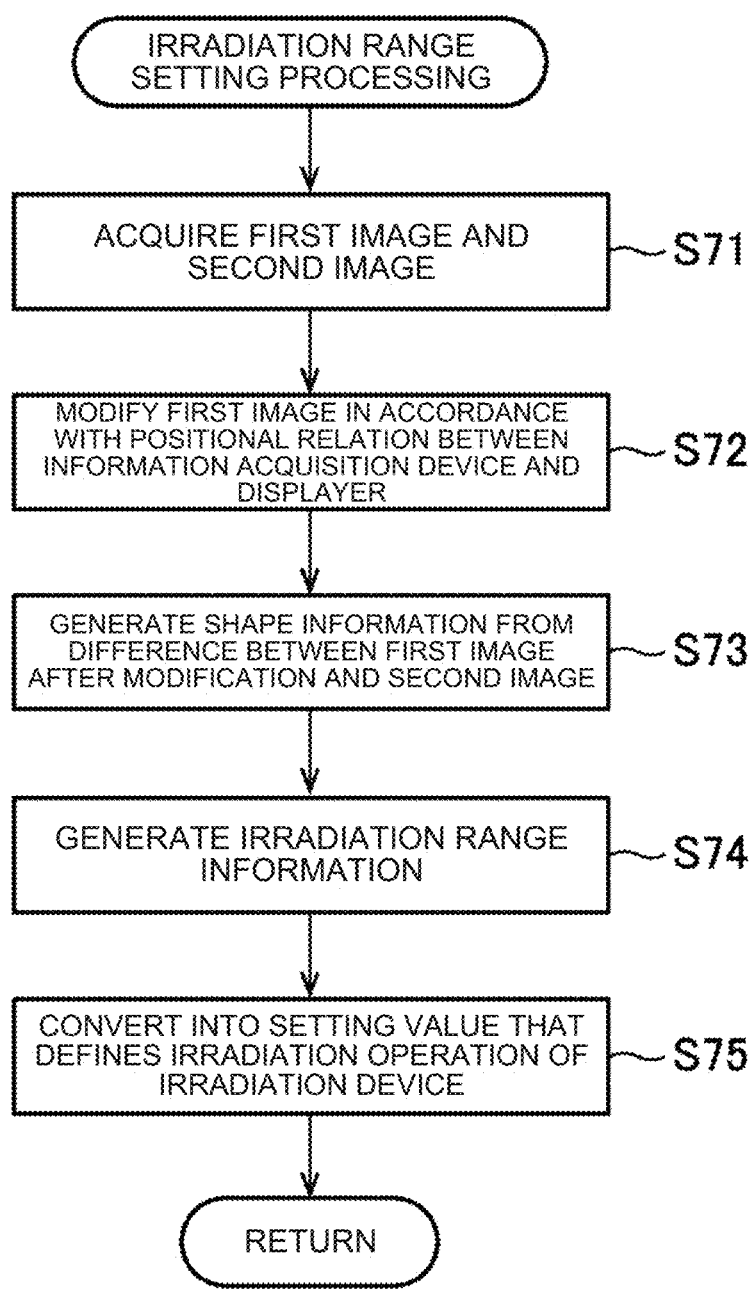
FIG. 16 is a flowchart illustrating an example of the irradiation range setting processing in the photographic illumination processing illustrated in FIG. 11.

Therefore, as illustrated in FIGS. 14 to 16, the illumination system 31 according to the first modification of the second embodiment performs the irradiation range setting processing as follows. FIG. 14 is a diagram schematically illustrating the first and second images acquired in the illumination system 31 according to a first modification of the second embodiment of the present disclosure and the image obtained by the difference of the first and second images. FIG. 15 is a block diagram illustrating a configuration of an important portion of an illumination system 31 according to the first modification of the second embodiment of the present disclosure. FIG. 16 is a flowchart illustrating an example of the irradiation range setting processing in the photographic illumination processing illustrated in FIG. 11.

The illumination system 31 according to the first modification of the second embodiment differs from the illumination system 31 according to the second embodiment in the processing flow of the irradiation range setting processing. Another difference is that the storage 7 includes in advance positional information 73 indicating the positional relation between the position of the light source of the irradiation device 3 and the displayer 10 of the display device 1. The other points are the same, and therefore, the description of the same configuration and processing flow will be omitted.

As illustrated in FIG. 16, in the illumination system 31 according to the first modification of the second embodiment, the shape information generator 61 acquires the image data of the first image and the image data of the second image (step S71) in the same manner as in step S61 illustrated in FIG. 13. As illustrated in FIG. 14, the first and second images acquired at this time are captured from different angles. Therefore, the shape information generator 61 modifies the image data of the first image in accordance with the positional relation between the information acquisition device 40 and the displayer 10 (step S72). In other words, the shape information generator 61 modifies the image data of the first image in such a manner that the first image is captured from the same angle as the second image on the basis of the positional information 73 stored in the storage 7. Then, the shape information generator 61 compares the image data of the first image after modification and the image data of the second image, takes the difference between them, and generates shape information (step S73). In other words, as illustrated in FIG. 14, the shape information generator 61 removes the modified first image from the second image, and extracts the difference. From this point on, step S74 and step S75 is the same as step S63 and step S64 illustrated in FIG. 13, and therefore, the description thereof is omitted.

As described above, the illumination system 31 according to the second embodiment as well as the first modification of the second embodiment, can easily irradiate the subject 20 with light because the setting processing device 5 can identify the range of the subject 20 and set the irradiation range. Further, when photographing a subject together with a background image displayed on the displayer 10, the illumination system 31 can irradiate light to only the range where the subject 20 is present, and therefore the shading of the subject 20 can be adjusted to match the shading in the background image. It is also possible to prevent light irradiated toward the subject 20 from being reflected by the displayer 10 and the shadow of the subject 20 from being reflected in the background image.

Third Embodiment

Figure 17:
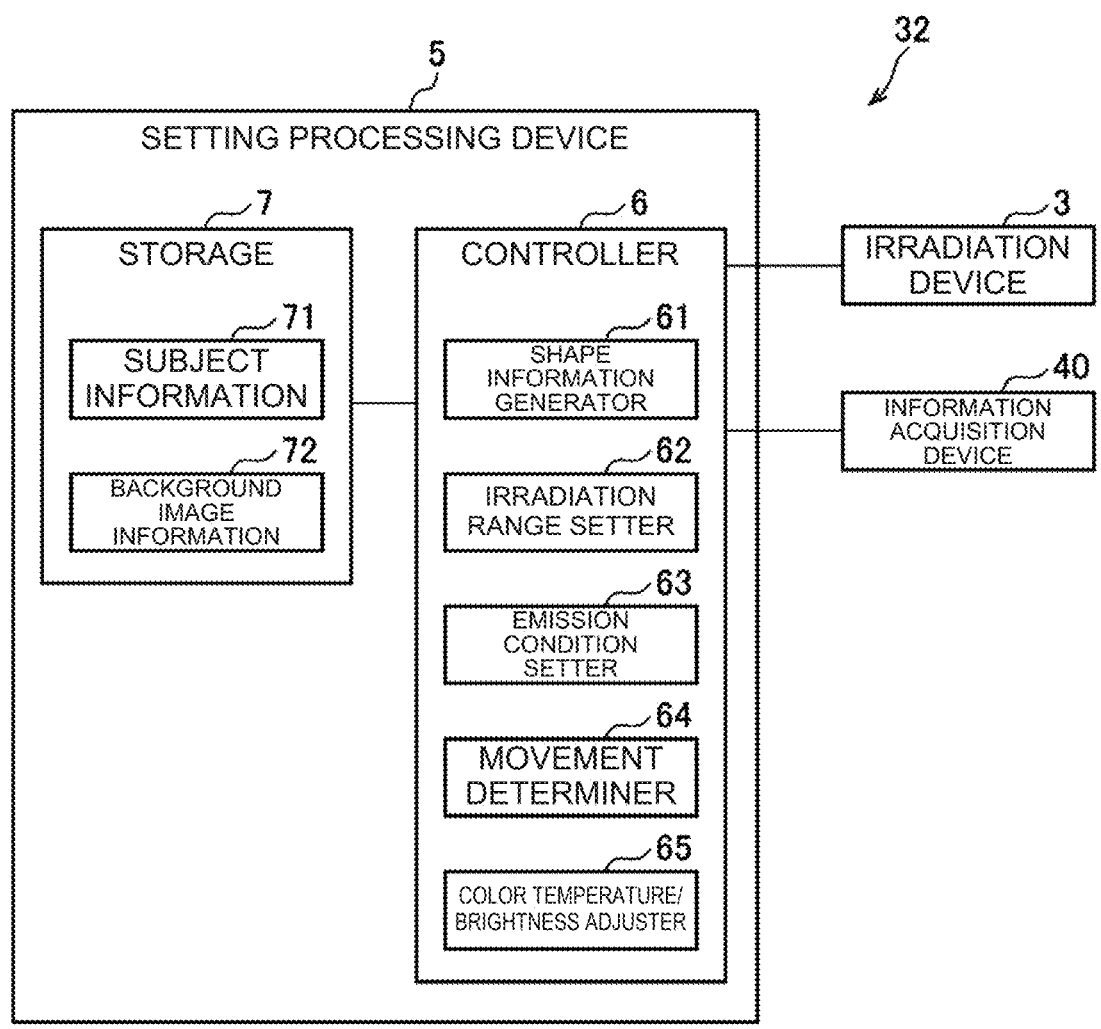
FIG. 17 is a block diagram illustrating a configuration of an important portion of an illumination system according to a third embodiment of the present disclosure.
Figure 18:
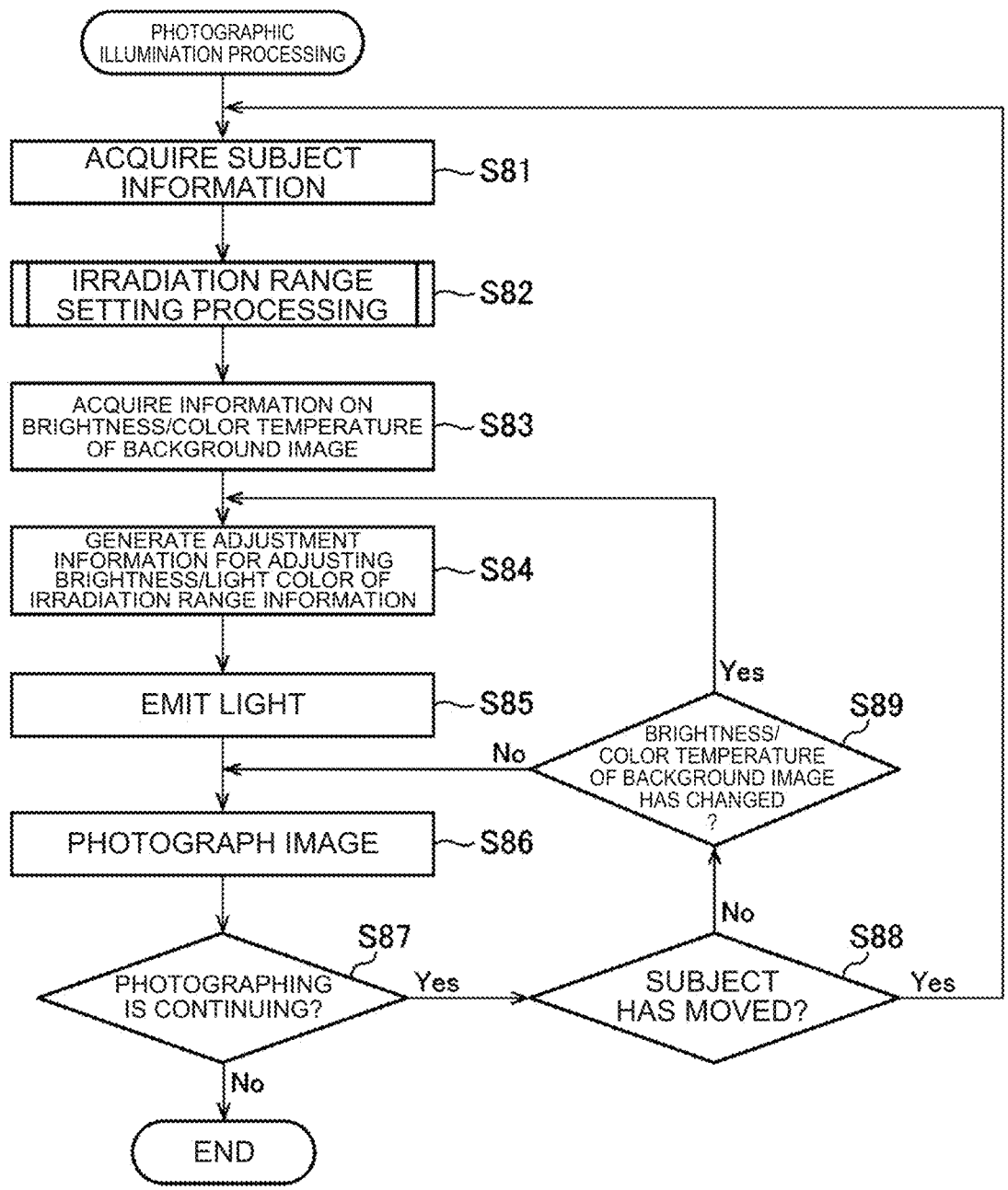
FIG. 18 is a flowchart illustrating an example of the photographic illumination processing in the illumination system according to the third embodiment of the present disclosure.

Next, an illumination system 32 according to a third embodiment will be described with reference to FIGS. 17 and 18. FIG. 17 is a block diagram illustrating a configuration of an important portion of the illumination system 32 according to the third embodiment of the present disclosure. Further, FIG. 18 is a flowchart illustrating an example of the photographic illumination processing in the illumination system 32 according to the third embodiment of the present disclosure.

When the background image displayed on the displayer 10 of the display device 1 is a moving picture, the brightness (luminance) may change in the background image. For example, the brightness of the background image changes when the sun is blocked by clouds.

Therefore, the illumination system 32 according to the third embodiment is configured in such a manner that an image that enhances the sense of unity between the background image and the subject 20 can be captured by irradiating the subject 20 with light in consideration of changes in brightness in the background image.

Specifically, as illustrated in FIG. 17, the illumination system 32 according to the third embodiment differs from the configuration of the illumination system 31 according to the second embodiment in that the controller 6 further includes a color temperature/brightness adjuster 65. Further, in the background image information 72, the storage 7 further includes information on the brightness and color temperature of the background image. The illumination system 32 according to the third embodiment is the same as the illumination system 31 according to the second embodiment except for the other configurations, and therefore the same reference numerals are given to the same members, and the description thereof is omitted.

The color temperature/brightness adjuster 65, for example, acquires information on the brightness and color temperature of the background image from the background image information 72 stored in the storage 7. Then, the color temperature/brightness adjuster 65 generates adjustment information to adjust the brightness and light color of the subject 20 illuminated by the light emitted from the light source of the irradiation device 3 in such a manner that the light emitted to the irradiation range is in accordance with the brightness and color temperature information of the background image.

Next, the photographic illumination processing by the illumination system 32 according to the third embodiment will be described with reference to FIG. 18. The processing from step S81 to step S82 and from step S85 to step S88 illustrated in FIG. 18 is the same as that from step S11 to step S16 illustrated in FIG. 3, and therefore the description thereof is omitted.

In the setting processing device 5, after the irradiation range setting processing is performed in step S82, the color temperature/brightness adjuster 65 reads the background image information 72 from the storage 7 and acquires information on the brightness and color temperature from the background image information 72 (step S83). The illumination system 32 according to the third embodiment is configured to include information on the brightness and color temperature of the background image in the background image information 72 stored in the storage 7. However, the embodiment is not limited to this configuration. For example, the illumination system 32 according to the third embodiment may be equipped with a color thermometer and an illuminance meter (which are not illustrated), and may be configured to acquire information on the color temperature of the background image from the color thermometer and information on the brightness of the background image from the illuminance meter.

The color temperature/brightness adjuster 65 generates adjustment information for adjusting the brightness and color of the light emitted by the irradiation device 3 to the irradiation range, on the basis of the acquired information on the brightness and color temperature of the background image (step S84). In the subsequent step S85, on the basis of the adjustment information generated by the color temperature/brightness adjuster 65, the irradiation device 3 emits light toward the irradiation range set by the irradiation range setting processing in step S82.

Further, if the movement determiner 64 determines that the subject 20 has not moved in step S88 ("No" in step S88), the color temperature/brightness adjuster 65 acquires information on the brightness and color temperature to determine whether the brightness and color temperature of the background image has changed (step 89). For example, the color temperature/brightness adjuster 65 can determine whether the brightness and color temperature of the background image has changed as follows. In other words, the information on the brightness and color temperature of the background image contained in the background image information 72 stored in the storage 7 includes information on temporal changes in the brightness and color temperature of the background image, and the color temperature/brightness adjuster 65 can determine whether the brightness and color temperature of the background image has changed on the basis of the elapsed time since the background image was first displayed. Alternatively, the color temperature/brightness adjuster 65 may be configured to determine whether the brightness and color temperature of the background image has changed on the basis of the color temperature information of the background image acquired from a color thermometer (not illustrated) or the brightness of the background image obtained from an illuminance meter (not illustrated). If "Yes" is determined in step S89, the processing proceeds to step S84. On the other hand, if "No" is determined in step S89, the processing proceeds to step S86.

As described above, in the setting processing device 5, the color temperature/brightness adjuster 65 can generate adjustment information, and therefore the irradiation device 3 can irradiate the subject 20 with light corresponding to the brightness and color temperature of the background image. Further, the photographic illumination processing according to the third embodiment can be repeated as the subject 20 moves, and therefore it is possible to have the irradiation device 3 irradiate the subject 20 after the move with light that has the appropriate brightness and color temperature. The illumination system 32 according to the third embodiment is equipped with the information acquisition device 40, which is an imaging device, but as an alternative to this information acquisition device 40, the illumination system 32 may be equipped with an information acquisition device 4, which is a distance measurement sensor, as is the case with the illumination system 30 of the first embodiment.

Fourth Embodiment

Figure 19:
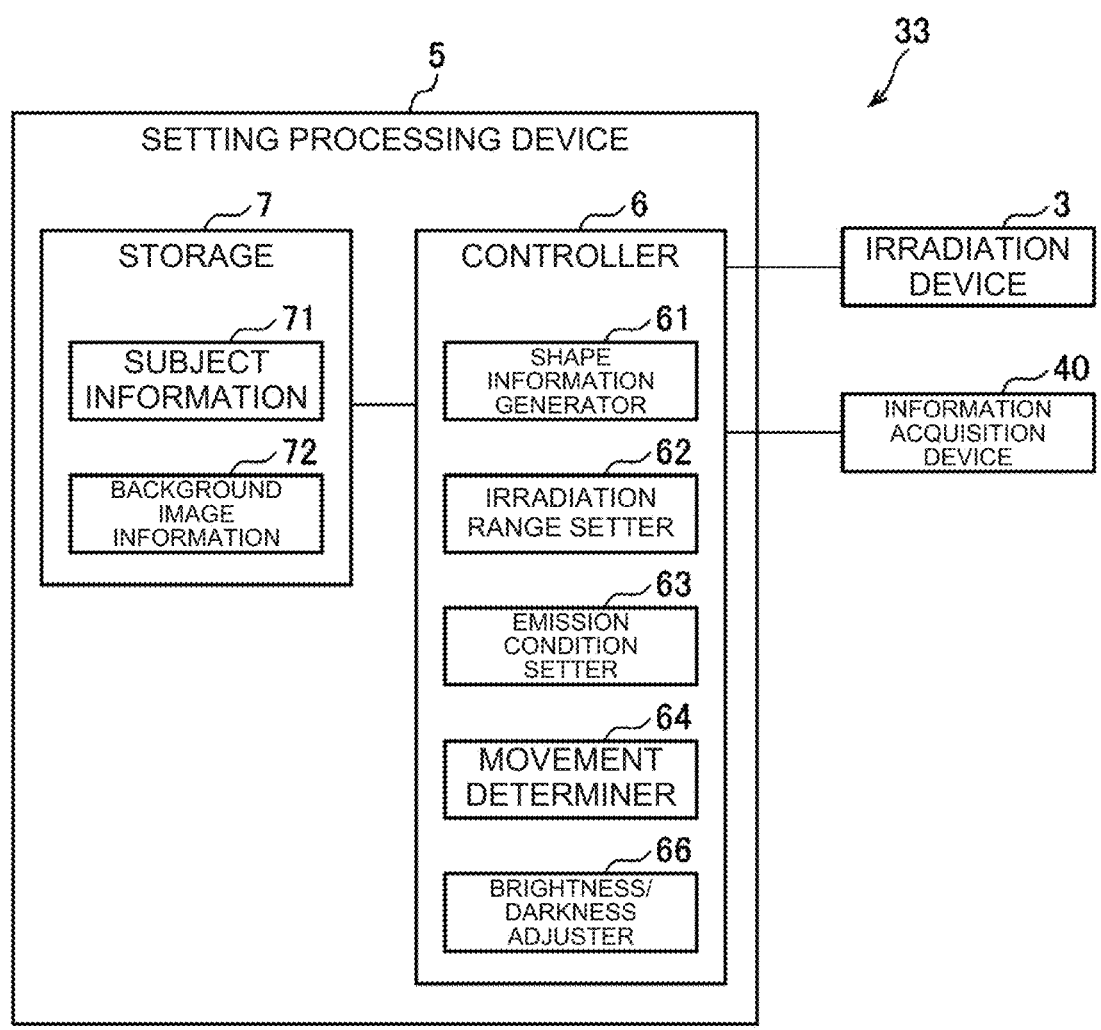
FIG. 19 is a block diagram illustrating a configuration of an important portion of an illumination system according to a fourth embodiment of the present disclosure.
Figure 20:
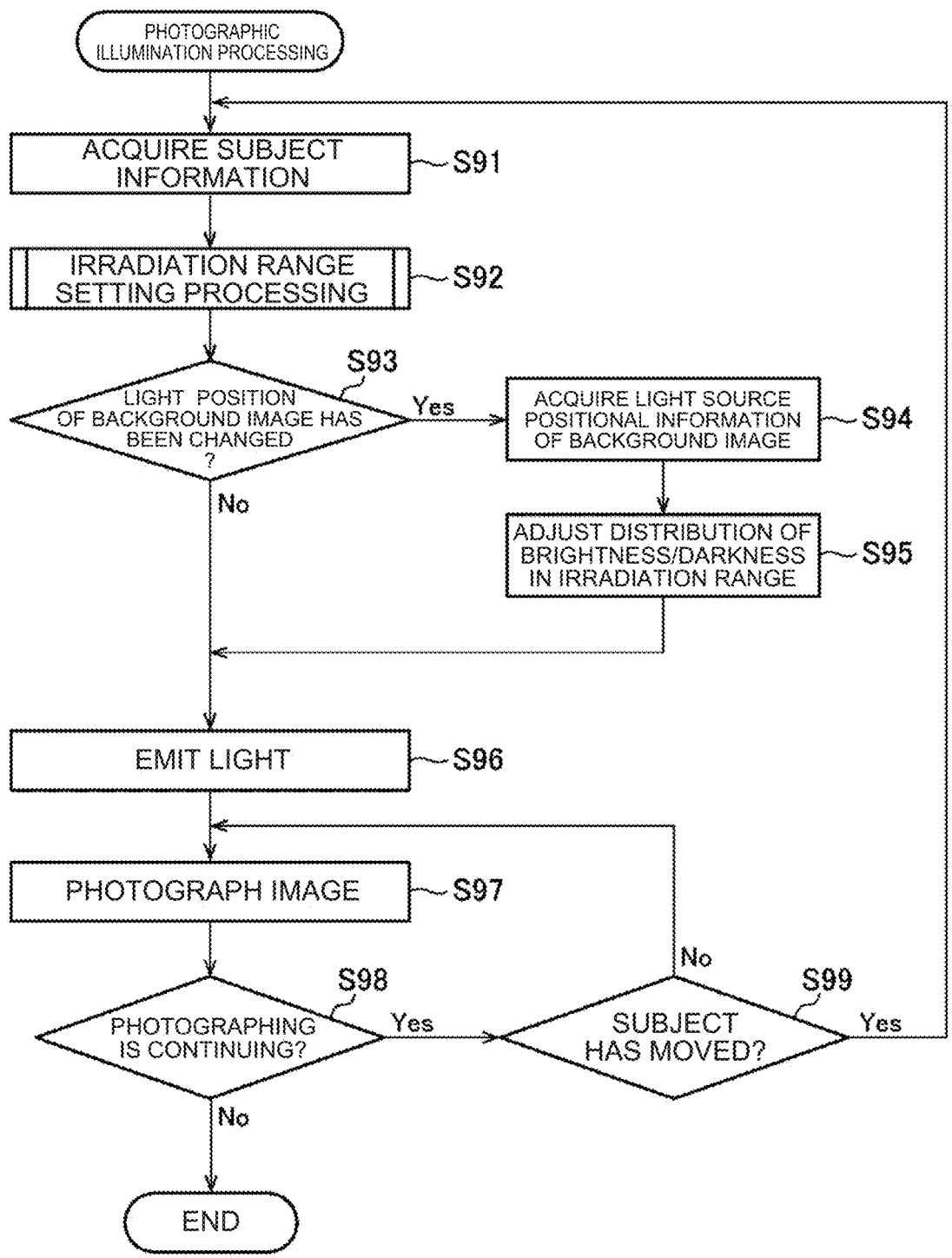
FIG. 20 is a flowchart illustrating an example of the photographic illumination processing in the illumination system according to the fourth embodiment of the present disclosure.

Next, an illumination system 33 according to a fourth embodiment of the present disclosure will be described with reference to FIGS. 19 and 20. FIG. 19 is a block diagram illustrating a configuration of an important portion of the illumination system 33 according to the fourth embodiment of the present disclosure. FIG. 20 is a flowchart illustrating an example of the photographic illumination processing in the illumination system 33 according to the fourth embodiment of the present disclosure.

When the background image displayed on the displayer 10 of the display device 1 is a moving image, the direction of light emission may change in the background image, and the shading direction of the background may change. When the shading direction of the background changes in this way, it is necessary to have the light to be irradiated to the subject 20 in such a manner that the shading direction of the subject 20 changes in accordance with the change in the shading direction of the background image.

The illumination system 33 according to the fourth embodiment of the present disclosure is configured to be able to irradiate the subject 20 in such a manner that the shading direction of the subject 20 changes in accordance with changes in the shading direction of the background image.

Specifically, as illustrated in FIG. 19, the illumination system 33 according to the fourth embodiment differs from the configuration of the illumination system 31 according to the second embodiment in that the controller 6 further includes a brightness/darkness adjuster 66. The illumination system 33 according to the fourth embodiment is the same as the illumination system 31 according to the second embodiment except for the other configurations, and therefore the same reference numerals are given to the same members, and the description thereof is omitted.

The brightness/darkness adjuster 66 determines whether the light source position for illuminating the background image has changed, and if determining that the light source position has changed, the brightness/darkness adjuster 66 acquires light source positional information indicating this light source position. Then, on the basis of this acquired light source positional information, brightness/darkness adjustment information is generated to adjust the distribution of brightness and darkness in the irradiation range.

Next, the photographic illumination processing by the illumination system 33 according to the fourth embodiment will be described with reference to FIG. 20. The processing from step S91 to step S92 and from step S96 to step S99 illustrated in FIG. 20 is the same as that from step S11 to step S16 illustrated in FIG. 3, and therefore the description thereof is omitted.

In the setting processing device 5, after the irradiation range setting processing is performed in step S92, the brightness/darkness adjuster 66 determines whether the light source position of the background image has been changed on the basis of the first or second image data acquired by the information acquisition device 40 (step S93). The determination as to whether the light source position has been changed by the brightness/darkness adjuster 66 can be made on the basis of whether the position of the shading in the previously acquired first or second image data and the position of the shading in the first or second image data acquired this time match. In other words, the brightness/darkness adjuster 66 determines that the light source position of the background image has not been changed ("No" in step S93) if the position of the shading in the previously acquired first or second image data and the position of the shading in the newly acquired first or second image data match. On the other hand, if the positions of the above shading are different, the brightness/darkness adjuster 66 determines that the light source position of the background image has been changed ("Yes" in step S93). If "Yes" is determined in step S93, the brightness/darkness adjuster 66 reads the background image information 72 from the storage 7, and acquires light source positional information indicating the light source position at the time the background image was captured, from the background image information 72 (step S94).

The light source positional information is information included in the background image information 72, and is information that is associated with time-series changes in the display of the background image. In other words, the light source positional information indicating the position of the light source is acquired when the background image is captured, and the time-series changes in the captured background image are associated with the light source positional information.

Alternatively, the light source positional information can be obtained as follows. In other words, the background image may be analyzed in advance to estimate the light source position from the distribution of brightness and darkness in the background image, and the information obtained from this estimation may be acquired as the light source positional information. Further, in a case where the background image is drawn by computer graphics (CG) such as 3D computer graphics (3DCG), the light source positional information may be acquired from the setting information at the time of 3DCG creation.

In the next step S95, the brightness/darkness adjuster 66 generates brightness/darkness adjustment information in which the distribution of brightness and darkness has been adjusted in the irradiation range set in step S92, on the basis of the light source positional information acquired from the storage 7 (step S95).

Then, the emission condition setter 63 converts the irradiation range information and brightness/darkness adjustment information into a setting value that defines the irradiation operation of the irradiation device 3, and outputs same to the irradiation device 3. The irradiation device 3 emits light toward the subject 20 on the basis of the setting value output from the emission condition setter 63 (step S96).

As described above, in the illumination system 33 according to the fourth embodiment, the brightness/darkness adjuster 66 can generate the brightness/darkness adjustment information. Therefore, when the light source position changes dynamically in the background image, the brightness and darkness in the irradiation range (subject 20) can be changed in accordance with this change in the light source position. Hence, the illumination system 33 can make the irradiation to the subject 20 reflect the change in the light source position in the background image.

In the illumination system 33 according to the fourth embodiment, the brightness/darkness adjuster 66 is configured to determine whether the light source position of the background image has been changed on the basis of the first or second image data acquired by the information acquisition device 40. However, as an alternative to the information acquisition device 40, which is an imaging device, the illumination system 33 according to the fourth embodiment may be equipped with an information acquisition device 4, which is a distance measurement sensor, as is the case with the illumination system 30 according to the first embodiment. Furthermore, the illumination system 33 according to the fourth embodiment may be provided with a separate imaging device that acquires image data for determining changes in the light source position of the background image.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An illumination system comprising:
   an irradiation device that irradiates light to a subject located in front of a displayer that displays a background image;
   an information acquisition device that acquires subject information for identifying the subject;
   a storage that stores background image information on the background image displayed on the displayer; and
   a controller that controls irradiation by the irradiation device,
   wherein the controller generates shape information of the subject on basis of a difference between the subject information acquired by the information acquisition device and the background image information stored in the storage, and sets an irradiation range where light is irradiated by the irradiation device on basis of the shape information.

2. The illumination system according to claim 1,
   wherein the information acquisition device includes a distance measurement device that acquires, as the subject information, at least distance information indicating a distance to the subject,
   wherein the storage stores, as the background image information, information indicating a distance to the displayer where the background image is displayed, and
   wherein the controller generates the shape information of the subject on basis of a difference between the distance information measured by the distance measurement device and the background image information.

3. The illumination system according to claim 1,
   wherein the information acquisition device includes an imaging device that acquires, as the subject information, a captured image including at least the subject, and
   wherein the storage stores, as the background image information, image data for displaying the background image on the displayer, and
   wherein the controller generates the shape information of the subject on basis of a difference between the captured image acquired by the imaging device and the background image information.

4. The illumination system according to claim 1, wherein the controller determines whether the subject has moved, and updates a setting of the irradiation range when determining that the subject has moved.

5. The illumination system according to claim 1, wherein the irradiation device is a projector.

6. The illumination system according to claim 1, wherein the irradiation device irradiates light only to the set irradiation range.

7. The illumination system according to claim 1, wherein the irradiation device irradiates light to the set irradiation range in such a manner that the set irradiation range is brighter than other ranges.

8. The illumination system according to claim 1, wherein the controller acquires information on brightness and a color temperature of the background image, generates adjustment information for adjusting brightness and color of light irradiated to the subject by the irradiation device, and controls irradiation to the irradiation range by the irradiation device, on basis of the adjustment information.

9. The illumination system according to claim 1, wherein the controller determines whether a position of a light source illuminating the background image has changed, and when determining that the position of the light source has changed, acquires light source positional information indicating the position of the light source after the change, and generates brightness/darkness adjustment information for adjusting distribution of brightness and darkness in the irradiation range on basis of the light source positional information, and controls irradiation to the irradiation range by the irradiation device, on basis of the brightness/darkness adjustment information.

10. A photography system comprising:
    the illumination system according to claim 1;
    a display device that has the displayer; and
    a photography device that photographs the subject together with the background image displayed on the displayer.

* * * * *